United States Patent
Saito

(10) Patent No.: US 10,450,487 B2
(45) Date of Patent: Oct. 22, 2019

(54) ONE-PART WATER-BASED ADHESIVE COMPOSITION

(71) Applicant: CEMEDINE CO., LTD., Tokyo (JP)

(72) Inventor: Tomonori Saito, Tokyo (JP)

(73) Assignee: CEMEDINE CO., LTD, Tokyo (JP)

( * ) Notice: Subject to any disclaimer, the term of this patent is extended or adjusted under 35 U.S.C. 154(b) by 0 days.

(21) Appl. No.: 15/562,719

(22) PCT Filed: Feb. 26, 2016

(86) PCT No.: PCT/JP2016/055884
§ 371 (c)(1),
(2) Date: Sep. 28, 2017

(87) PCT Pub. No.: WO2016/158135
PCT Pub. Date: Oct. 6, 2016

(65) Prior Publication Data
US 2018/0118987 A1 May 3, 2018

(30) Foreign Application Priority Data

Mar. 30, 2015 (JP) .................... 2015-069715

(51) Int. Cl.
C09J 175/04 (2006.01)
C09J 11/06 (2006.01)
C08G 18/08 (2006.01)
C08K 5/5419 (2006.01)
C09D 5/02 (2006.01)
C09J 175/06 (2006.01)
C09J 175/08 (2006.01)

(52) U.S. Cl.
CPC ........ *C09J 175/04* (2013.01); *C08G 18/0866* (2013.01); *C08K 5/5419* (2013.01); *C09D 5/024* (2013.01); *C09D 5/027* (2013.01); *C09J 11/06* (2013.01); *C09J 175/06* (2013.01); *C09J 175/08* (2013.01); *C08G 2170/80* (2013.01)

(58) Field of Classification Search
None
See application file for complete search history.

(56) References Cited

U.S. PATENT DOCUMENTS

| | | | | |
|---|---|---|---|---|
| 4,727,168 A * | 2/1988 | Yoshino | .............. | C08K 5/544 556/408 |
| 4,772,716 A * | 9/1988 | Mulhaupt | .............. | C08G 18/10 548/110 |
| 5,206,285 A * | 4/1993 | Castellucci | .............. | C08G 77/54 523/421 |
| 5,336,748 A * | 8/1994 | Castellucci | .............. | C08G 77/54 523/421 |
| 5,421,876 A * | 6/1995 | Janoski | .............. | E04D 11/02 106/269 |
| 5,468,317 A * | 11/1995 | Hsieh | .............. | C09D 133/06 156/108 |
| 5,872,203 A * | 2/1999 | Wen | .............. | C08G 18/698 528/66 |
| 6,465,559 B1 * | 10/2002 | Bechara | .............. | C03C 25/326 524/478 |
| 7,595,372 B2 * | 9/2009 | Lejeune | .............. | C09D 5/028 528/12 |
| 8,263,185 B2 * | 9/2012 | Huck | .............. | C08G 77/26 427/387 |
| 8,343,601 B1 * | 1/2013 | Ekin | .............. | C03C 17/322 428/34.4 |
| 2006/0167190 A1 * | 7/2006 | Trabesinger | .............. | C08G 18/10 525/457 |
| 2006/0257673 A1 * | 11/2006 | Desor | .............. | B32B 3/30 428/448 |
| 2007/0190345 A1 * | 8/2007 | Sutter | .............. | C09J 4/00 428/448 |
| 2009/0053411 A1 * | 2/2009 | Sutter | .............. | C08L 83/08 427/207.1 |
| 2009/0163649 A1 * | 6/2009 | Sasaki | .............. | C08G 18/10 524/589 |
| 2010/0043945 A1 * | 2/2010 | Dohner | .............. | C03C 17/30 156/98 |
| 2010/0159239 A1 * | 6/2010 | Nun | .............. | B05D 7/08 428/354 |
| 2011/0045219 A1 * | 2/2011 | Stewart | .............. | C03C 17/322 428/34.7 |
| 2012/0225228 A1 * | 9/2012 | Barth | .............. | B60R 21/235 428/35.2 |
| 2016/0040298 A1 * | 2/2016 | Mizuno | .............. | C09D 5/08 148/247 |

FOREIGN PATENT DOCUMENTS

JP  H07-149840 A  6/1995
JP  H10-25463 A  1/1998
(Continued)

OTHER PUBLICATIONS

Machine translation of JP-2002038014, translation generated Jan. 2019, 7 pages. (Year: 2017).*

(Continued)

*Primary Examiner* — Robert S Loewe
(74) *Attorney, Agent, or Firm* — McGlew and Tuttle, P.C.

(57) ABSTRACT

Provided is a one-part water-based adhesive composition which suffers no yellowing and is excellent in adhesiveness and durability. The one-part water-based adhesive composition includes (A) an aqueous dispersion of a polyurethane resin and (B) a silane compound obtained by reacting a specific epoxysilane compound with an aminosilane compound represented by the following Formula (2), the amount of the epoxysilane compound being in the range of 1.5 to 10 mol per 1 mol of the aminosilane compound, at a reaction temperature of 40 to 100° C.

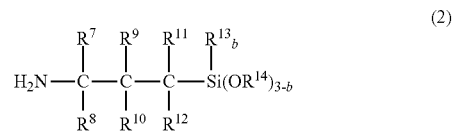

(2)

(In Formula (2), $R^7$ to $R^{12}$ are each a hydrogen atom or an alkyl group, $R^{13}$ is a monovalent hydrocarbon group, $R^{14}$ is an alkyl group, and b is 0 or 1.)

14 Claims, No Drawings

(56) References Cited

FOREIGN PATENT DOCUMENTS

| | | | | |
|---|---|---|---|---|
| JP | H10-195085 A | | 7/1998 | |
| JP | H10-330720 A | | 12/1998 | |
| JP | 2002038014 A | * | 2/2002 | ............. C08L 83/06 |
| JP | 2008-174656 A | | 7/2008 | |
| WO | WO-2014163165 A1 | * | 10/2014 | ............... C09D 5/08 |

OTHER PUBLICATIONS

Hyojun Gijutsushu Kinzoku Hyomen Shori ni Okeru 6-ka Crom Free to no Kankyo Taio Gijutsu, Nippon-Koku Tokkyocho [online], Mar. 28, 2003 [retrieval date: Mar. 14, 2016], Internet:<URL:http://www.jpo.go.jp/shiryou/s_sonota/hyoujun_gijutsu/chromium_ free/4-104_A-AI-2-3.htm>.

* cited by examiner

ONE-PART WATER-BASED ADHESIVE COMPOSITION

TECHNICAL FIELD

The present invention relates to a one-part water-based adhesive composition and particularly relates to a one-part water-based adhesive composition having excellent adhesiveness and durability.

BACKGROUND ART

Solvent-type adhesive agents have been rapidly replaced with water-based adhesive agents in recent years in the field of adhesive agents because the water-based adhesive agents have various advantages over the solvent-type adhesive agents in occupational safety and health problems, environmental concerns, suitability for resource saving, and the like.

As a method of making a curable polymer into an aqueous emulsion, Patent Document 1 discloses a method of producing a curable polymer emulsion including a step (1) in which a solution formed from a hydrolyzable silyl group-containing radical polymerizable monomer, a monomer that can be copolymerized with said monomer, and an oil-soluble radical polymerization initiator is emulsion-dispersed in an aqueous medium containing a surfactant having an HLB of 1.5 to 20 and a pH buffer, and a step (2) in which the aqueous emulsion dispersion obtained in the step (1) is fed continuously or intermittently into an aqueous medium that is being stirred to polymerize the monomers in the medium. However, the method of producing the polymerizable emulsion described in Patent Document 1 requires preparation of an emulsion having a small particle size of the monomer mixture as the aqueous emulsion to be used. Thus, to industrially produce the polymerizable emulsion, problems exist in that a special dispersing device having high shear force is required and that the operation becomes complicated.

Furthermore, Patent Document 2 discloses, as a water-based adhesive composition, a highly water resistant adhesive composition containing a main agent formed from one type or two or more types selected from the group consisting of a water-soluble polymer aqueous solution, an aqueous latex, and an aqueous emulsion, a curing agent formed from an isocyanate compound containing 2,4'-diphenylmethane diisocyanate, and a compound having a specific imide structure. However, the adhesive composition described in Patent Document 2 requires a mixing step because it is a two-part composition, and there are problems such as occurrence of mixing failure.

CITATION LIST

Patent Literature

Patent Document 1: JP 07-149840 A
Patent Document 2: JP 2008-174656 A

SUMMARY OF INVENTION

Technical Problem

An object of the present invention is to provide a one-part water-based adhesive composition which suffers no yellowing and is excellent in adhesiveness and durability.

Solution to Problem

To solve the problems described above, the one-part water-based adhesive composition of the present invention contains: (A) an aqueous dispersion of a polyurethane resin and (B) a silane compound obtained by reacting an epoxysilane compound represented by Formula (1) below with an aminosilane compound represented by Formula (2) below, the amount of the epoxysilane compound being in the range of 1.5 to 10 mol per 1 mol of the aminosilane compound, at a reaction temperature of 40 to 100° C.

[Chemical Formula 1]

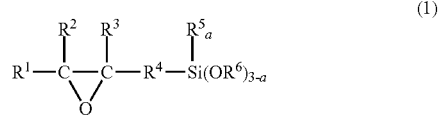

(1)

In Formula (1), $R^1$ to $R^3$ are each a hydrogen atom or an alkyl group, $R^4$ is an alkylene group or an alkyleneoxyalkylene group, $R^5$ is a monovalent hydrocarbon group, $R^6$ is an alkyl group, and a is 0, 1, or 2.

[Chemical Formula 2]

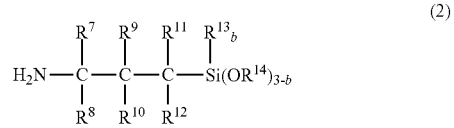

(2)

In Formula (2), $R^7$ to $R^{12}$ are each a hydrogen atom or an alkyl group, $R^{13}$ is a monovalent hydrocarbon group, $R^{14}$ is an alkyl group, and b is 0 or 1.

Advantageous Effects of Invention

The one-part water-based adhesive composition of the present invention suffers no yellowing, has excellent adhesiveness and durability, and does not contain organic solvents, phthalic acid-based plasticizers, and the like, thereby achieving significant effect which is free of environmental concerns such as sick building syndrome.

The use of the one-part water-based adhesive composition of the present invention is not limited and can be used in a wide variety of use. Examples thereof include building use, industrial use, use for primers, use for coating materials, and the like. Furthermore, because the water-based adhesive composition of the present invention can be used as a one-part, excellent workability is achieved.

DESCRIPTION OF EMBODIMENTS

Embodiments of the present invention will be described below; however, these embodiments are shown as examples, and it is obvious that various modifications are possible as long as such modifications do not deviate from the technical ideas of the present invention.

The one-part water-based adhesive composition of the present invention contains: (A) an aqueous dispersion of a polyurethane resin and (B) a silane compound obtained by reacting an epoxysilane compound represented by Formula (1) above with an aminosilane compound represented by Formula (2) above, the amount of the epoxysilane compound being in the range of 1.5 to 10 mol per 1 mol of the aminosilane compound, at a reaction temperature of 40 to 100° C.

The (A) aqueous dispersion of the polyurethane resin of the present invention is obtained by dispersing or emulsifying a polyurethane resin in an aqueous dispersion.

The method of producing the polyurethane resin aqueous dispersion used in the present invention is not particularly limited as long as it is a polyurethane resin aqueous dispersion in which a polyurethane resin is dispersed or emulsified in an aqueous medium. Examples of the polyurethane resin aqueous dispersion include (1) a polyurethane resin aqueous dispersion obtained by neutralizing a carboxy group-containing polyurethane prepolymer, which is obtained by reacting polyisocyanate, polyol, and carboxy group-containing polyol, with a tertiary amine or the like to emulsion-disperse into water, and simultaneously or successively with the emulsion dispersion, polymerizing by a chain extender, such as polyamine; (2) a polyurethane resin aqueous dispersion obtained by emulsion-dispersing a prepolymer with a terminal isocyanate, which is obtained by reacting polyisocyanate and polyol, in water in the presence of a surfactant, and simultaneously or successively with the emulsion dispersion, polymerizing by a chain extender, such as polyamine; (3) a polyurethane resin aqueous dispersion obtained by a method in which a polyurethane prepolymer described in (1) and (2) above is synthesized in the presence of an organic solvent and emulsion-dispersed, and then, as necessary, the organic solvent is removed by a publicly known method; and the like.

As the polyisocyanate, any polyisocyanate that has been conventionally used in typical production of polyurethane can be used. However, one type or two or more types of alicyclic diisocyanate, aliphatic diisocyanate, and/or aromatic diisocyanate having a molecular weight of 500 or less is preferably used. Examples thereof include hexamethylene diisocyanate, isophorone diisocyanate, 4,4'-dicyclohexylmethane diisocyanate, norbornene diisocyanate, 2,4-tolylene diisocyanate, 2,6-tolylene diisocyanate, 4,4'-diphenylmethane diisocyanate, p-phenylene diisocyanate, xylylene diisocyanate, tetramethylxylylene diisocyanate, 1,5-naphthylene diisocyanate, and the like. One type or two or more types of these can be used. Furthermore, tri- or higher functional polyisocyanate such as trimers of hexamethylene diisocyanate can be used together.

Examples of the polyol include publicly known polyols, such as polyether polyols, such as polyethylene glycol, polypropylene glycol, polytetramethylene glycol, and poly(methyltetramethylene)glycol; polyester polyols, such as polybutylene adipate diol, polybutylene sebacate diol, polyhexamethylene adipate diol, poly(3-methyl-1,5-pentylene adipate) diol, poly(3-methyl-1,5-pentylene sebacate) diol, polycaprolactone diol, and poly($\beta$-methyl-$\delta$-valerolactone) diol; polycarbonate polyols, such as polyhexamethylene carbonate diol and poly(3-methyl-1,5-pentylene carbonate) diol; polyester polycarbonate polyols; polyolefin polyols, such as polyethylene polyol, polypropylene polyol, polyisobutene polyol, polybutadiene polyol and hydrogenated products thereof, and polyisoprene polyol and hydrogenated products thereof. The polyurethane resin can be formed by using one type or two or more types of these polyols.

As the chain extender component, any chain extender that has been conventionally used in typical production of polyurethane can be used. However, a low molecular weight compound having two or more active hydrogen atoms that can react with an isocyanate group in a molecule and having a molecular weight of 300 or less is preferably used. Examples thereof include diols, such as ethylene glycol, propylene glycol, 1,4-butanediol, 1,6-hexanediol, 1,4-bis($\beta$-hydroxyethoxy)benzene, 1,4-cyclohexanediol, bis-($\beta$-hydroxyethyl)terephthalate, and xylylene glycol; triols, such as trimethylolpropane; pentaols, such as pentaerythritol; diamines, such as hydrazine, ethylenediamine, propylenediamine, hexamethylenediamine, nonamethylenediamine, xylylenediamine, isophoronediamine, piperazine and derivatives thereof, phenylenediamine, tolylenediamine, xylenediamine, adipic dihydrazide, and isophthalic dihydrazide; amino alcohols, such as aminoethyl alcohol, aminopropyl alcohol, and N-(2-aminoethyl)ethanol amine; alkoxysilyl group-containing amines, such as $\gamma$-aminopropyltriethoxysilane, N-phenyl-$\gamma$-aminopropyl trimethoxysilane, N-$\beta$-(aminoethyl)-$\gamma$-aminopropyl trimethoxysilane, N-$\beta$-(aminoethyl)-$\gamma$-aminopropylmethyl-dimethoxysilane, and the like. One type or two or more types of these can be used. Furthermore, during the chain extending reaction, a monoamine compound, such as n-butylamine, 4-aminobutyric acid, and 6-aminohexanoic acid, can be used together with a bi- or higher functional polyamine compound.

The polyurethane resin preferably contains a neutralized carboxyl group in the polyurethane resin skeleton to emulsion-disperse or dissolve in water. Introduction of the neutralized carboxyl group into the polyurethane resin skeleton can be achieved by, in the polyurethanation reaction, also using a compound having a carboxyl group or a salt thereof and at least one active hydrogen atom, such as a hydroxyl group or an amino group, and as necessary, by neutralizing with a basic substance, such as tertiary amine and hydroxides of alkali metals. Examples of such a compound include 2,2-dimethylolpropionic acid, 2,2-dimethylolbutyric acid, 2,2-dimethylolvaleric acid, and the like. Furthermore, polyester polyol, polyester polycarbonate polyol, or the like obtained by copolymerizing the compounds described above can be used. Among these, a method, in which a polyurethane prepolymer is produced using 2,2-dimethylolpropionic acid or 2,2-dimethylolbutyric acid, and after the completion of prepolymer reaction or when the prepolymer is emulsified in water, conversion into a carboxylic acid salt is performed by adding a basic substance, such as trimethylamine, triethylamine, N,N-dimethyl ethanol amine, N,N-diethyl ethanol amine, N-methyl diethanol amine, sodium hydroxide, and potassium hydroxide, is preferable.

Examples of the organic solvent include aromatic hydrocarbons, such as toluene and xylene; ketones, such as acetone and methyl ethyl ketone; ethers, such as tetrahydrofuran and dioxane; acetic esters, such as ethyl acetate and butyl acetate; nitriles, such as acetonitrile; amides, such as dimethylformamide and N-methylpyrrolidone; halogen-containing hydrocarbons, such as chloroform and methylene chloride, and the like. One type of these may be used alone, or these may be mixed for use. Among these, use of an organic solvent having a boiling point of 150° C. or lower is preferable, and use of acetone, methyl ethyl ketone, and ethyl acetate that have high solubility to polyurethane resins is more preferable.

When the polyurethane resin is produced, an urethanation catalyst can be used as necessary. As the urethanation catalyst, for example, nitrogen-containing compounds, such as triethylamine, triethylenediamine, and N-methylmorpholine; metal salts, such as potassium acetate, zinc stearate, and tin octylate; organometallic compounds, such as dibutyl tin dilaurate can be used.

Furthermore, the surfactant that can be used during the production of aqueous dispersion of the polyurethane resin is not particularly limited, and anionic surfactants, nonionic surfactants, amphoteric surfactants, and the like can be used. However, from the perspective of preventing aggregation of the polyurethane resin, use of an anionic surfactant or a nonionic surfactant is preferable.

As the anionic surfactant, for example, alkylbenzene sulfonates, polyoxyethylene alkylphenyl sulfonates, polyoxyethylene alkyldiphenyl ether sulfonates, alkyldiphenyl ether disulfonates, dialkylsuccinate sulfonates, and the like can be used.

As the nonionic surfactant, for example, polyoxyethylene alkyl ethers, polyoxyethylene alkylphenyl ethers, polyoxyethylene diphenyl ethers, polyoxyethylene-polyoxypropylene block copolymers, and acetylene diol-based surfactants can be used.

Furthermore, in the present invention, besides the surfactants described above, fluorine-based surfactants, silicone-based surfactants, and surfactants having a polymerizable unsaturated group, which is typically called reactive emulsifiers, can be used.

A commercially available product can be used for the aqueous dispersion of the polyurethane resin. Examples of the commercially available product of the aqueous dispersion of the polyether-based polyurethane resin include HYDRAN WLS-201 (manufactured by DIC Corporation), HYDRAN-312B (manufactured by DIC Corporation), EVAFANOL HA-15 (manufactured by Nicca Chemical Co., Ltd.), SUPERFLEX 130 (manufactured by DKS Co., Ltd.), and the like. Examples of the aqueous dispersion of the polyester-based polyurethane resin include HYDRAN ADS-110 (manufactured by DIC Corporation), SUPERFLEX 210 (manufactured by DKS Co., Ltd.), SUPERFLEX 500M (manufactured by DKS Co., Ltd.), and the like. Examples of the aqueous dispersion of the polycarbonate-based polyurethane resin include HYDRAN WLS-210 (manufactured by DIC Corporation), SUPERFLEX 420 (manufactured by DKS Co., Ltd.), SUPERFLEX 460 (manufactured by DKS Co., Ltd.), EVAFANOL HA-107C (manufactured by Nicca Chemical Co., Ltd.), EVAFANOL HA-50C (manufactured by Nicca Chemical Co., Ltd.), and the like.

The (B) silane compound is a silane compound obtained by reacting an epoxysilane compound represented by Formula (1) below with an aminosilane compound represented by Formula (2) below, the amount of the epoxy silane compound being in the range of 1.5 to 10 mol per 1 mol of the aminosilane compound, at a reaction temperature of 40 to 100° C.

[Chemical Formula 3]

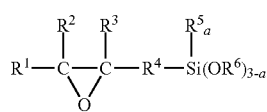

(1)

In Formula (1), $R^1$ to $R^3$ are each a hydrogen atom or an alkyl group, are each preferably a hydrogen atom, a methyl group, an ethyl group, or a propyl group, and are each more preferably a hydrogen atom. $R^4$ is an alkylene group or an alkyleneoxyalkylene group, is preferably a methylene group, an ethylene group, a propylene group, a butylene group, a pentylene group, a hexylene group, a heptylene group, an octylene group, a methyleneoxyethylene group, a methyleneoxypropylene group, a methyleneoxybutylene group, an ethyleneoxyethylene group, or an ethyleneoxypropylene group, and is more preferably a butylene group, an octylene group, or a methyleneoxypropylene group. $R^5$ is a monovalent hydrocarbon group, is preferably an alkyl group, such as a methyl group, an ethyl group, and a propyl group; an alkenyl group, such as a vinyl group, an allyl group, and an butenyl group; or an aryl group, such as a phenyl group and a tolyl group, and is more preferably a methyl group. When a plurality of the $R^5$ moieties exist, these may be the same or different. $R^6$ is an alkyl group, is preferably a methyl group, an ethyl group, or a propyl group, and is more preferably a methyl group or an ethyl group. When a plurality of the $R^6$ moieties exist, these may be the same or different. a is 0, 1, or 2, and is preferably 0.

[Chemical Formula 4]

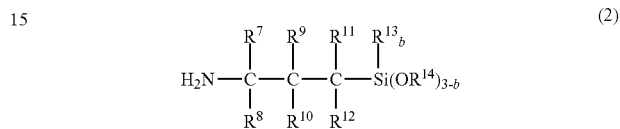

(2)

In Formula (2) above, $R^7$ to $R^{12}$ are each a hydrogen atom or an alkyl group, are each preferably a hydrogen atom, a methyl group, an ethyl group, or a propyl group, and are each more preferably a hydrogen atom. $R^{13}$ is a monovalent hydrocarbon group, is preferably an alkyl group or an alkoxy group, is more preferably a methyl group, an ethyl group, a propyl group, a methoxy group, an ethoxy group, or a propoxy group, and is even more preferably a methoxy group or an ethoxy group. $R^{14}$ is an alkyl group, is preferably a methyl group, an ethyl group, or a propyl group, and is more preferably a methyl group or an ethyl group. b is 0 or 1. When (3-b) moieties of the $R^{14}$ moieties exist, these may be the same or different.

Examples of the epoxysilane compound include 4-oxiranylbutyl trimethoxysilane, 8-oxiranyloctyl trimethoxysilane, 3-glycidoxypropyl trimethoxysilane, 3-glycidoxypropyl methyldimethoxysilane, 3-glycidoxypropyl triethoxysilane, and the like.

Examples of the aminosilane compound include 3-aminopropyl trimethoxysilane, 3-aminopropyl triethoxysilane, 3-aminopropyl methyldimethoxysilane, 3-aminopropyl methyldiethoxysilane, and the like.

The reaction condition of the epoxysilane compound and the aminosilane compound is such that the primary amino group of the aminosilane compound is reacted with the epoxy silane compound to convert the primary amino group to a secondary amino group or a tertiary amino group so that no primary amino group remains.

The reaction is carried out under the condition that the reaction ratio (molar ratio) of the epoxysilane compound and the aminosilane compound is such that the amount of the epoxysilane compound is from 1.5 to 10 mol, preferably from 1.6 to 5.0 mol, and more preferably from 1.7 to 2.4 mol, per 1 mol of the aminosilane compound.

A carbasilatrane derivative represented by Formula (3) below can be obtained by heating and reacting the epoxysilane compound and the aminosilane compound in the presence or absence of a solvent (e.g., alcohol) at a reaction temperature of 40 to 100° C., and preferably 40 to 80° C., cleaving the epoxy ring of the epoxysilane compound, and forming a ring between the hydroxyl group produced by this reaction and the alkoxy group of the aminosilane compound by alcohol exchange reaction. The carbasilatrane derivative represented by Formula (3) below is a compound having a peak at −60 ppm to −70 ppm in $^{29}$Si-NMR.

[Chemical Formula 5]

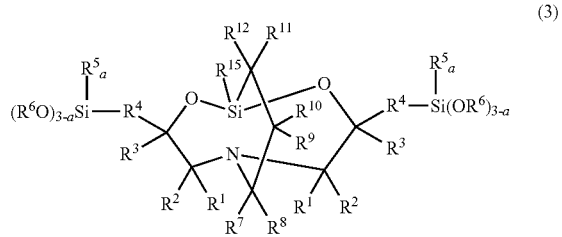

(3)

In Formula (3) above, $R^1$ to $R^6$ and a are each the same as those described in Formula (1) above; and $R^7$ to $R^{12}$ are each the same as those described in Formula (2) above; when b in Formula (2) above is 0, $R^{15}$ is the same as $OR^{14}$ of Formula (2) above; and when b in Formula (2) above is 1, $R^{15}$ is the same as $R^{13}$ of Formula (2) above. Note that a part of the alkoxy groups bonded to the silicon atoms may be substituted via the alcohol exchange reaction, and the silicon atom-bonded alkoxy group of the raw material and the silicon atom-bonded alkoxy group in the carbasilatrane derivative produced by the reaction may not be the same.

The compounded proportion of the (B) silane compound is not particularly limited; however, the (B) silane compound is compounded preferably in an amount of 0.05 to 15 parts by mass, more preferably in an amount of 0.1 to 10 parts by mass, and even more preferably in an amount of 0.5 to 5 parts by mass, per 100 parts by mass of the solid content of the (A) aqueous dispersion of the polyurethane resin. One type of the (B) silane compound may be used alone, or two or more types of the (B) silane compounds may be used in combination.

The content of water in the water-based adhesive composition of the present invention is preferably adjusted to result in the solid content concentration in the water-based adhesive composition of from 10 to 80 mass %, and more preferably adjusted to result in the solid content concentration of from 30 to 70 mass %.

In addition to the components (A) and (B), as necessary, the water-based adhesive composition of the present invention may contain various additives, such as fillers, stabilizers, dispersants, antifoaming agents, preservatives, thickeners, and plasticizers.

The water-based adhesive composition of the present invention can be cured at room temperature, and suitably used as a room temperature-curable type water-based adhesive composition; however, the curing may be promoted appropriately by heating as necessary.

As the filler, publicly known fillers that are typically used in water-based adhesive compositions can be widely used. Examples thereof include calcium carbonate, magnesium carbonate, silica sand, calcium sulfate, barium sulfate, talc, aluminum hydroxide, kaoline, clay, mica, diatomaceous earth, glass, zinc oxide, magnesium oxide, titanium oxide, carbon black, synthetic fibers, glass fibers, alumina fibers, carbon fibers, various whiskers, and the like. One type of these may be used alone, or two or more types of these may be used in combination. Furthermore, the average particle size of the filler is preferably from 1 to 50 µm, and more preferably from 10 to 40 µm. The average particle size of the filler within the range described above results in excellent adhesive strength, and can suppress the increase in viscosity and gelling of the water-based adhesive composition.

Examples of the stabilizer include polyoxyalkylene alkyl ethers, polyoxyethylene polyoxypropylene block copolymers, and the like.

Examples of the dispersant include inorganic dispersants, such as tripolyphosphates and pyrophosphates, polymer dispersants, such as polycarboxylates, and the like.

Examples of the antifoaming agent include mineral oil-based nonionic surfactants, silicone-based antifoaming agents, such as polydimethylsiloxane oil, and ethylene oxide- or propylene oxide-modified dimethylsilicones or dimethylsilicone emulsions, mineral oils, alcohol-based antifoaming agents, such as acetylene alcohol, and the like.

Examples of the preservative include cyclic nitrogen-based compounds, cyclic nitrogen sulfur-based compounds, and the like.

Examples of the thickener include polyacrylate, hydroxy ethylcellulose, water-soluble urethane resins, and the like.

As the plasticizer, use of a plasticizer except phthalic acid-based plasticizers is preferable, and examples thereof include (poly)alkylene glycols, such as ethylene glycol, diethylene glycol, and propylene glycol, as well as derivatives of these, such as (poly)alkylene glycol monoalkyl ethers, such as ethylene glycol monobutyl ether and diethylene glycol monomethyl ether, and (poly)alkylene glycol monoalkyl acetates, such as ethylene glycol monomethyl acetate and diethylene glycol monoethyl acetate, adipic acid derivatives, such as di(2-ethylhexyl) adipate and diisodecyl adipate, sebacic acid derivatives, such as di-n-butyl sebacate and di(2-ethylhexyl) sebacate, citric acid esters, glycerin esters, and the like.

EXAMPLES

The present invention will be further specifically described below using examples; however, these examples are set forth to illustrate the present invention, and the scope of the present invention is not limited thereto.

(Synthesis Example 1) Synthesis of (B) Silane Compound

As shown in Table 1, in a flask equipped with a stirring apparatus, a nitrogen gas introduction tube, a thermometer, a liquid-dripping device, and a reflux condenser, 100 g of 3-aminopropyltrimethoxysilane (trade name: Z-6610, manufactured by Dow Corning Toray Silicone Co., Ltd.) and 276 g of 3-glycidoxypropyltrimethoxysilane (trade name: Z-6040, manufactured by Dow Corning Toray Silicone Co., Ltd.) were charged and stirred at 50° C. for 72 hours to obtain carbasilatrane. For the obtained carbasilatrane, disappearance of the peak derived from the epoxy group around 910 $cm^{-1}$ was confirmed and presence of the peak of secondary amine around 1140 $cm^{-1}$ was confirmed by FT-IR, and appearance of a new peak at −60 ppm to −70 ppm was confirmed by $^{29}$Si-NMR.

TABLE 1

| (B) Silane compound | Synthesis Example 1 |
|---|---|
| 3-Aminopropyltrimethoxysilane | 100.0 |
| 3-Glycidoxypropyltrimethoxysilane | 276.0 |

In Table 1, the compounded amount of each compounded substance is shown in part by mass.

(Synthesis Examples 2 to 3) Synthesis of Hydrolyzable Group-Containing Compound

The substances to be compounded were mixed in proportions shown in Table 2 at room temperature and reacted at 80° C. for 3 days to obtain a hydrolyzable group-containing compound (1). Note that the hydrolyzable group-containing compound (2) was cured during the reaction, and a reaction product was not obtained.

TABLE 2

|  | Synthesis Example 2 | Synthesis Example 3 |
|---|---|---|
| Hydrolyzable group-containing compound | (1) | (2) |
| 3-Aminopropyltrimethoxysilane | 100.0 | — |
| N-2-(aminoethyl)-3-aminopropylmethyl-dimethoxysilane | — | 90.0 |
| 3-Glycidoxypropyltrimethoxysilane | 131.8 | — |
| jER828 | — | 120.0 |

In Table 2, the compounded amount of each compounded substance is shown in part by mass, and details of the compounded substances are as follows.

jER828: Bisphenol A-type epoxy resin, manufactured by Mitsubishi Chemical Corporation Examples 1 to 8

The substances to be compounded were mixed and stirred in the compounding proportions shown in Table 3 and the water-based adhesive compositions of the present invention were prepared.

TABLE 3-I

| | | | | Examples | | | | | | |
|---|---|---|---|---|---|---|---|---|---|---|
| | | | 1 | 2 | 3 | 4 | 5 | 6 | 7 | 8 |
| Composition | (A) | HYDRAN WLS-201 | 100 | 100 | 100 | | | 95 | 95 | 60 |
| | | SUPERFLEX 201 | | | | 100 | | 5 | | |
| | | HYDRAN WLS-210 | | | | | 100 | | 5 | 40 |
| | (B) | Silane compound | | | | | | | | |
| | | 3-Aminopropyltrimethoxysilane | 0.2 | 1 | 1.7 | 1 | 1 | 1 | 1 | 1 |
| | | 3-Glycidoxypropyltrimethoxysilane | | | | | | | | |
| | | Hydrolyzable group-containing compound (1) | | | | | | | | |
| | | Hydrolyzable group-containing compound (2) | | | | | | | | |
| | | ADEKA NOL UH-541VF | 0.8 | 0.8 | 0.8 | 0.8 | 0.8 | 0.8 | 0.8 | 0.8 |
| Evaluation | | Initial mixed state | Good | Good | Good | Good | Good | Good | Good | Good |
| | Ordinary strength (N/mm$^2$) | Acrylic resin | 1.9 | 1.9 | 1.9 | 1 | 1.3 | 1.7 | 1.9 | 1.6 |
| | | Polycarbonate resin | 2 | 2 | 2 | 1 | 2 | 2 | 2 | 2.1 |
| | | Sulfuric acid alumite | 1 | 1 | 1.1 | 2.5 | 1.1 | 1.4 | 1.2 | 1.4 |
| | | Water resistance | Excellent | Excellent | Excellent | Excellent | Excellent | Excellent | Excellent | Excellent |
| | | Discoloration | Excellent | Excellent | Excellent | Excellent | Excellent | Excellent | Excellent | Excellent |
| | | Storage stability | Excellent | Excellent | Excellent | Excellent | Excellent | Excellent | Excellent | Excellent |

TABLE 3-II

| | | | Comparative Examples | | | | | |
|---|---|---|---|---|---|---|---|---|
| | | | 1 | 2 | 3 | 4 | 5 | 6 |
| Composition | (A) | HYDRAN WLS-201 | 100 | 100 | 100 | 100 | 100 | 100 |
| | | SUPERFLEX 201 | | | | | | |
| | | HYDRAN WLS-210 | | | | | | |
| | (B) | Silane compound | | | | | | |
| | | 3-Aminopropyltrimethoxysilane | | 1 | | 1 | | |
| | | 3-Glycidoxypropyltrimethoxysilane | | | 1 | 1 | | |
| | | Hydrolyzable group-containing compound (1) | | | | | 1 | |
| | | Hydrolyzable group-containing compound (2) | | | | | | 1 |
| | | ADEKA NOL UH-541VF | 0.8 | 0.8 | 0.8 | 0.8 | 0.8 | 0.8 |
| Evaluation | | Initial mixed state | Good | Gelled | Good | Gelled | Good | Mixing was not possible |
| | Ordinary strength (N/mm$^2$) | Acrylic resin | 1.9 | — | 1.7 | — | 1.8 | — |
| | | Polycarbonate resin | 2 | — | 2 | — | 1.8 | — |
| | | Sulfuric acid alumite | 1 | — | 1.2 | — | 2 | — |
| | | Water resistance | Poor | — | Excellent | — | Excellent | — |
| | | Discoloration | Excellent | — | Excellent | — | Poor | — |
| | | Storage stability | Excellent | — | Poor | — | Excellent | — |

In Table 3, the compounded amount of each compounded substance is shown in part by mass, and details of the compounded substances are as follows.

HYDRAN WLS-201: Aqueous dispersion of polyether-based polyurethane resin, manufactured by DIC Corporation; solid content: approximately 35%

SUPERFLEX 210: Aqueous dispersion of polyester-based polyurethane resin, manufactured by DKS Co., Ltd.; solid content: approximately 35%

HYDRAN WLS-210: Aqueous dispersion of polycarbonate-based polyurethane resin, manufactured by DIC Corporation; solid content: approximately 35%

Silane Compound: Carbasilatrane Compound Synthesized in Synthesis Example 1

Hydrolyzable group-containing compound (1): The reaction product of 3-aminopropyltrimethoxysilane and 3-glycidoxypropyltrimethoxysilane synthesized in Synthesis Example 2

Hydrolyzable group-containing compound (2): The reaction product of 3-aminopropyltrimethoxysilane and jER828 (bisphenol A-type epoxy resins, manufactured by Mitsubishi Chemical Corporation) synthesized in Synthesis Example 3

ADEKA NOL UH-541VF: Special polymer nonion-based thickener, manufactured by Adeka Corporation Following tests were performed on the obtained water-based adhesive compositions. The results are shown in Table 3.

1. Ordinary Adhesive Strength Test

Adhesive strength was measured in accordance with JIS K 6850 "Adhesives—Determination of tensile lap-shear strength of rigid-to-rigid bonded assemblies". That is, using an acrylic resin (3×25×75 mm, ACRYLITE (R)L, manufactured by Mitsubishi Rayon Co., Ltd.), a polycarbonate resin (3×25×75 mm, PC 1600, manufactured by Takiron Co., Ltd.), and sulfuric acid alumite (2×25×100 mm) as adherends, the adhesive agent was applied on the both sides of the adherends so that the amount of the adhesive agent was 100 g/m² wet, and then adhered. After the test samples were cured for 168 hours, the test was performed at a tensile test speed of 50 mm/min.

2. Water Resistance Test

Adhesive strength after immersion in water was measured in accordance with JIS K 6850 "Adhesives—Determination of tensile lap-shear strength of rigid-to-rigid bonded assemblies". That is, the adhesive agent was applied on the both sides of sulfuric acid alumite (2×25×100 mm) so that the amount of the adhesive agent was 100 g/m² wet, and then adhered. After the test samples were cured for 168 hours, the test samples were immersed in water for 24 hours, and the test was then performed at a tensile test speed of 50 mm/min.

Excellent: The retention ratio of the strength relative to the ordinary strength was 50% or greater. Poor: The retention ratio of the strength relative to the ordinary strength was less than 50%.

3. Discoloration Test

The adhesive agent was applied on an aluminum surface so that the amount of the adhesive agent was 100 g/m² wet, dried at 80° C. for 2 hours, and then left in an atmosphere at 150° C. for 3 hours. Thereafter, the presence or absence of discoloration was visually observed.

Excellent: No discoloration was observed. Poor: Discoloration to yellow or brown was observed.

4. Storage Stability Test

The adhesive agent was placed in a tightly sealed container and left in an atmosphere at 50° C. for 1 week, and the viscosity increase ratio relative to the state before the storing was measured. The evaluation criteria are as follows.

Excellent: less than 1.5 times. Marginal: 1.5 or greater but less than 2.0 times. Poor: 2.0 times or greater.

Comparative Examples 1 to 6

The substances to be compounded were mixed and stirred in the compounding proportions shown in Table 3 to prepare the water-based adhesive compositions of Comparative Examples 1 to 6, and the tests were performed. The results are shown in Table 3. Note that Comparative Examples 2 and 4 generated gelled products during the mixing of the substances to be compounded. In Comparative Example 6, the hydrolyzable group-containing compound (2) was cured and could not be blended.

The invention claimed is:

1. A one-part water-based adhesive composition, comprising:
   an aqueous dispersion of a polyurethane resin;
   a thickener comprising at least one of polyacrylate, hydroxy ethylcellulose and water-soluble urethane resins; and
   a silane compound represented by Formula (3)

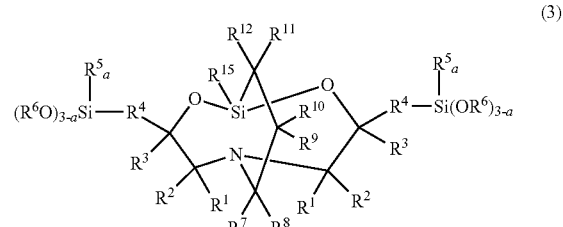

(3)

wherein in Formula (3), $R^1$ to $R^3$ are each a hydrogen atom or an alkyl group, $R^4$ is an alkylene group or an alkyleneoxyalkylene group, $R^5$ is a monovalent hydrocarbon group, $R^6$ is an alkyl group, a is 0, 1, or 2, $R^7$ to $R^{12}$ are each a hydrogen atom or an alkyl group, and $R^{15}$ is one of an alkoxy group and a monovalent hydrocarbon group.

2. A composition in accordance with claim 1, wherein the silane compound is in an amount of 0.05 to 15 parts by mass per 100 parts by mass of the solid content of aqueous dispersion of the polyurethane resin.

3. A composition in accordance with claim 2, further comprising an additive comprising one or more of fillers, stabilizers, dispersants, antifoaming agents, preservatives, thickeners, and plasticizers.

4. A composition in accordance with claim 1, further comprising:
   a filler comprising at least one of calcium carbonate, magnesium carbonate, silica sand, calcium sulfate, barium sulfate, talc, aluminum hydroxide, kaoline, clay, mica, diatomaceous earth, glass, zinc oxide, magnesium oxide, titanium oxide, carbon black, synthetic fibers, glass fibers, alumina fibers, carbon fibers and whiskers.

5. A composition in accordance with claim 4, wherein an average particle size of the filler is from 1 to 50 μm.

6. A composition in accordance with claim 1, further comprising:
a stabilizer comprising at least one of polyoxyalkylene alkyl ethers and polyoxyethylene polyoxypropylene block copolymers.

7. A composition in accordance with claim 1, further comprising:
a dispersant comprising one or more inorganic dispersants.

8. A composition in accordance with claim 1, further comprising:
a dispersant comprising one or more of tripolyphosphates, pyrophosphates and polycarboxylates.

9. A composition in accordance with claim 1, further comprising:
an antifoaming agent comprising at least one of mineral oil-based nonionic surfactants, polydimethylsiloxane oil, ethylene oxide-modified dimethylsilicones, propylene oxide-modified dimethylsilicones, dimethylsilicone emulsions, mineral oils and acetylene alcohol.

10. A composition in accordance with claim 1, further comprising:
a preservative comprising at least one of cyclic nitrogen-based compounds and cyclic nitrogen sulfur-based compounds.

11. A composition in accordance with claim 1, further comprising:
a plasticizer comprising at least one of ethylene glycol, diethylene glycol, propylene glycol, ethylene glycol monobutyl ether and diethylene glycol monomethyl ether, ethylene glycol monomethyl acetate, diethylene glycol monoethyl acetate, di(2-ethylhexyl) adipate and diisodecyl adipate, di-n-butyl sebacate and di(2-ethylhexyl) sebacate, citric acid esters and glycerin esters.

12. A composition in accordance with claim 1, wherein the silane compound is obtained by heating and reacting an epoxysilane compound and an aminosilane compound at a reaction temperature of 40° C. to 100° C.

13. A one-part water-based adhesive composition, comprising:
an aqueous dispersion of a polyurethane resin;
a dispersant comprising one or more inorganic dispersants; and
a silane compound represented by Formula (3)

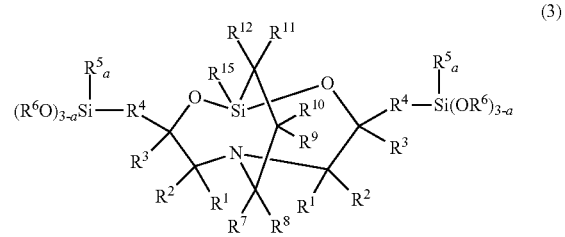

(3)

wherein in Formula (3), $R^1$ to $R^3$ are each a hydrogen atom or an alkyl group, $R^4$ is an alkylene group or an alkyleneoxyalkylene group, $R^5$ is a monovalent hydrocarbon group, $R^6$ is an alkyl group, a is 0, 1, or 2, $R^7$ to $R^{12}$ are each a hydrogen atom or an alkyl group, and $R^{15}$ is one of an alkoxy group and a monovalent hydrocarbon group.

14. A one-part water-based adhesive composition, comprising:
an aqueous dispersion of a polyurethane resin;
a dispersant comprising one or more of tripolyphosphates, pyrophosphates and polycarboxylates; and
a silane compound represented by Formula (3)

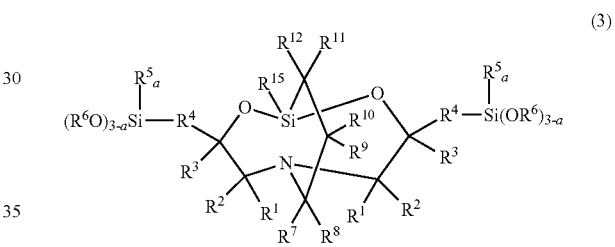

(3)

wherein in Formula (3), $R^1$ to $R^3$ are each a hydrogen atom or an alkyl group, $R^4$ is an alkylene group or an alkyleneoxyalkylene group, $R^5$ is a monovalent hydrocarbon group, $R^6$ is an alkyl group, a is 0, 1, or 2, $R^7$ to $R^{12}$ are each a hydrogen atom or an alkyl group, and $R^{15}$ is one of an alkoxy group and a monovalent hydrocarbon group.

* * * * *